United States Patent [19]
Yokoyama

[11] Patent Number: 4,746,636
[45] Date of Patent: May 24, 1988

[54] SILICON NITRIDE SINTERED BODY

[75] Inventor: Kiyoshi Yokoyama, Hayato, Japan

[73] Assignee: Kyocera Corporation, Kyoto, Japan

[21] Appl. No.: 841,552

[22] Filed: Mar. 20, 1986

[51] Int. Cl.$^4$ .............................................. C04B 35/58
[52] U.S. Cl. ......................................... 501/97; 501/98
[58] Field of Search .............................. 501/96, 97, 98

[56] References Cited

U.S. PATENT DOCUMENTS 4,535,063  8/1985  Matsuhiro et al. .................... 501/97
4,609,633  9/1986  Fukuhara et al. ..................... 501/97

FOREIGN PATENT DOCUMENTS 2614839  10/1976  Fed. Rep. of Germany ........ 501/98
53-138417  12/1978  Japan .................................... 501/97
58-64268  4/1983  Japan .................................... 501/97

Primary Examiner—Mark L. Bell
Assistant Examiner—A. Knab
Attorney, Agent, or Firm—Spensley Horn Jubas & Lubitz

[57] ABSTRACT

Disclosed is a sintered body of a composition comprising (i) 80 to 99% by weight of $Si_3N_4$, (ii) 1 to 20% by weight of oxides, nitrides and the like of Sr, W and a rare earth element as the main additive and (iii) an oxide, a nitride or the like of Al, Ti, Cr, Si or Mo as the auxiliary additive in an amount of up to 5 parts by weight per 100 parts by weight of the components (i) and (ii). This sintered body is excellent in oxidation resistance and mechanical strength at high temperatures.

8 Claims, No Drawings

SILICON NITRIDE SINTERED BODY

BACKGROUND OF THE INVENTION (1) Field of the Invention

The present invention relates to a silicon nitride sintered body. More particularly, the present invention relates to a silicon nitride sintered body which is excellent in the oxidation resistance and mechanical strength at high temperatures.

(2) Description of the Prior Art

A composition comprising silicon nitride as the main component and an oxide of a rare earth element as the additive has been heretofore used as a silicon nitride material excellent in the strength at high temperatures. The reason is that if an oxide of a rare earth element (hereinafter referred to as "Re") is added, a compound of this oxide with silicon nitride formed in the grain boundary was a high melting point and hence, a sintered body obtained can have a high strength at high temperatures.

However, this silicon nitride sintered body comprising a rare earth element incorporated therein is oxidized when used in an oxidizing atmosphere for a long time, and a silicate of the rare earth element is formed, for example, by reaction of $Re_2Si_3O_3N_4 \rightarrow Re_2Si_2O_7$. Since this silicate has a high melting point and a high glass transition temperature (Tg), a vitrious layer is not formed but the silicate takes the form of powder. Therefore, the silicate fails to form a protecting film sealing the surface layer of the sintered body.

Accordingly, oxidation advances even to the interior of the sintered body and the oxidation resistance at high temperatures of the silicon nitride sintered body is degraded.

Recently, Japanese Patent Application Laid-Open Specification No. 146981/84 has proposed a silicon nitride sintered body comprising oxides or oxynitrides of Sr, Mg, a rare earth element and Zr in amounts of 0.1 to 15% by weight, 0.1 to 15% by weight, 0.1 to 15% by weight and 0.1 to 11% by weight as Sr, Mg, the rare earth element and Zr, respectively, the balance being at least 70% by weight of $Si_3N_4$. It is taught that if the Mg component is not contained, the strength (at room temperature) and the toughness at break (at room temperature) of the sintered body are degraded. However, the oxidation resistance or mechanical strength at high temperatures of the silicon nitride sintered body is not mentioned in this prior art at all.

SUMMARY OF THE INVENTION

I found that if strontium, tungsten and a rare earth element are added at a specific ratio as the sintering aid in sintering silicon nitride, a dense crystalline composite oxide or its glass having a high melting point is effectively formed in the grain boundary of silicon nitride and the oxidation resistance and strength at high temperatures are highly improved. It also was found that even in the system where tungsten is excluded from the foregoing three components, if the mixing ratio of the remaining two components is within a certain range, a dense crystalline composite oxide or its glass havng a high melting point is similarly formed effectively and the oxidation resistance and strength at high temperatures of the sintered body are highly improved.

In accordance with one aspect of the present invention, there is provided a silicon nitride sintered body comprising (i) 80 to 99% by weight of silicon nitride, (ii) 1 to 20% by weight of a strontium component, a tungsten component and a rare earth element component and (iii) a component of at least one element selected from the group consisting of aluminum, titanium, chromium, gallium, zirconium, silicon and molybdenum in an amount of up to 5 parts by weight per 100 parts by weight of the sum of the components (i) and (ii), wherein the atomic ratio (Sr/Re) of strontium (Sr) to the rare earth element (Re) is in the range of from 0.01 to 100, the atomic ratio (W/Re) of tungsten (W) to the rare earth element (Re) is in the range of from 0.01 to 100, the relative density ratio to the theoretical density is at least 95%, and a substantial portion of the strontium, tungsten and rare earth element components is present in the grain boundary phase of silicon nitride.

In accordance with another aspect of the present invention, there is provided a silicon nitride sintered body, which is a sintered body of a composition consisting essentially of (i) 80 to 99% by weight of silicon nitride, (ii') 1 to 20% by weight of a strontium component and a rare earth element component and (iii') a component of at least one element selected from the group consisting of aluminum, titanium, chromium, gallium, silicon and molybdenum in an amount of up to 5 parts by weight per 100 parts by weight of the sum of the components (i) and (ii'), wherein the atomic ratio (Sr/Re) of strontium to the rare earth element (Re) is in the range of from 0.01 to 100, the relative density ratio to the theoretical density is at least 95%, and a substantial portion of the strontium and rare earth element components is present in the boundary grain phase of silicon nitride.

DETAILED DESCRIPTION OF THE PREFERRED EMBODIMENTS

In principle, the sintered body of the present invention is formed by sintering a composition comprising the component (i) and the component (ii) or (ii'). In this composition, silicon nitride ($Si_3N_4$) should be present in an amount of 80 to 99% by weight, expecially 85 to 95% by weight, and the component (ii) or (ii') should be present in an amount of 1 to 20% by weight, especially 5 to 15% by weight.

If the amount of the sintering aid (ii) or (ii') is too small and below the above-mentioned range, the sintering property per se is drastically reduced and it is difficult to form a crystalline composite oxide or its glass excellent in the heat resistance in the grain boundary of $Si_3N_4$. If the amount of silicon nitride is too small and below the above-mentioned range, the oxidation resistance or strength at high temperatures of the sintered body is lower than that of the sintered body included within the scope of the present invention.

In the present invention, either α-type silicon nitride or β-type silicon nitride may be used. However, α-type silicon nitride is preferred from the viewpoint of the mechanical strength. It is preferred that the average particle size of starting silicon nitride be smaller than 3 μm, especially 1 μm.

The first embodiment of the present invention is characterized in that the sintering aid comprises a strontium component, a tungsten component and a rare earth element (Re) component. It is important that these components should be present in such amounts that the atomic ratio Sr/Re is in the range of from 0.01 to 100, especially from 0.1 to 10, and the atomic ratio W/Re is in the range of from 0.01 to 100, especially from 0.1 to 10.

If the above-mentioned three components are used as the sintering aid, a substantial portion, that is, at least 50 atom%, especially at least 90 atom%, of Sr, W and Re can be made present in the grain boundary of silicon nitride, and a crystalline composite oxide or its glass having a high melting point, that is, a protecting film composed of at least one composite oxide or its glass selected from the group consisting of $Sr_3WO_6$, $Sr_2Wo_5$, $SrWO_4$, $Re_2SrO_4$, $SrRe_4O_7$ and $Sr_3SiO_5$, can be formed. Accordingly, a silicon nitride sintered body having a highly improved oxidation resistance at high temperatures can be obtained without degradation of the strength at high temperatures.

If the above-mentioned atomic ratio Sr/Re or W/Re is less than 0.01, the amount of the rare earth element becomes excessive, the grain boundary is likely to form a crystal phase poor in the oxidation resistance, such as that of N-melilite, and a vitrious layer is not formed, with the result that the high oxidation resistance intended in the present invention cannot be obtained. On the other hand, if the above-mentioned atomic ratio exceeds 100, the amount of Sr or W is excessive and sintering per se becomes difficult, with the result that the strength is reduced. Furthermore, if the amount of the foregoing components present in the grain boundary is too small, a composite oxide as mentioned above is hardly formed in the grain boundary and the intended effects of the present invention cannot be attained.

As the strontium component, there can be used strontium oxide, strontium nitride, strontium carbide and compounds capable of forming these compounds under sintering conditions, such as strontium carbonate. It is preferred that the strontium component be used in an amount of 0.5 to 19% by weight based on the sum of the components (i) and (ii).

As the tungsten component, there can be used tungsten oxide, tungsten nitride, tungsten carbide and tungsten silicide. It is preferred that the tungsten component be used in an amount of 0.1 to 19% by weight based on the sum of the components (i) and (ii).

As the rare earth element, there can be mentioned at least one element selected from the group consisting of Y, Yb, La, Ce, Nd, Sm, Eu, Er, Gd, Tb, Dy, Sc, Lu, etc. The rare earth element may be used in the form of an oxide or nitride, or if desired, it may be used in the form of a single element. It is generally preferred that the rare earth element component be used in an amount of 0.5 to 19% by weight based on the sum of the components (i) and (ii).

In addition to the above component (ii), if desired, at least one member selected from Al, Ti, Cr, Ga, Zr, Si and Mo, compounds thereof, that is, oxides, carbides and nitrides thereof, and compounds capable of forming said oxides, carbides and nitrides under sintering conditions may be incorporated in an amount of up to 5 parts by weight per 100 parts by weight of the sum of the components (i) and (ii) as the auxiliary additive component (iii) so as to further improve the oxidation resistance. If the amount of the auxiliary additive component (iii) exceeds 5 parts by weight per 100 parts by weight of the sum of the components (i) and (ii), the oxidation resistance and mechanical strength at high temperatures of the sintered body are degraded.

In accordance with another embodiment of the present invention, strontium and rare earth element components are used as the main additive component and the atomic ratio Sr/Re is adjusted within the range of from 0.01 to 100, especially from 0.1 to 10. If the above-mentioned two components are used at the above-mentioned atomic ratio, a composite oxide such as $Re_2SrO_4$, $SrRe_4O_7$ or $Sr_3SiO_5$ or its glass is formed in the grain boundary of the sintered body. Since this composite oxide has a high melting point, when the sintered body is used at a high temperature, the composite oxide is present as a vitrious or somewhat crystalline vitrious covering film having a high melting point on the surface of silicon nitride and prevents intrusion of $O_2$ from the outside. That is, the composite oxide forms a so-called antioxidant covering film. Furthermore, since this vitrious covering film is not formed of a hard glass, cracks are hardly formed in the covering film even under such application conditions that the sintered body is subjected to high temperatures and low temperatures repeatedly (for example, in a gas turbine). Accordingly, intrusion of $O_2$ through cracks can be prevented.

If the above-mentioned atomic ratio is less than 0.01, the amount of the rare earth element is excessive and the grain boundary readily forms a crystal layer poor in the oxidation resistance, such as that of N-melilite, without formation of a vitrious layer, with the result that the high oxidation resistance intended in the present invention cannot be attained. On the other hand, if the above-mentioned atomic ratio exceeds 100, the amount of Sr is excessive and sintering per se becomes difficult, and the strength is reduced. Furthermore, if the amount of the strontium and rare earth element components present in the grain boundary phase is too small, a composite oxide as mentioned above is hardly formed in the grain boundary phase and the intended effects of the present invention cannot be attained.

In the second embodiment of the present invention, in addition to the main additive components (ii'), if desired, at least one member selected from the group consisting of Al, Ti, Cr, Ga, Si and Mo, and compounds thereof, that is, oxides, carbides and nitrides thereof, may be incorporated in an amount of up to 5 parts by weight per 100 parts by weight of the components (i) and (ii') as the auxiliary additive component (iii') so as to further improve the oxidation resistance.

The formation of the silicon nitride sintered body of the present invention will now be described.

The above-mentioned composition is homogeneously blended and finely divided by dry pulverization or wet pulverization using a rotary mill or a vibro-mill. The mixed powder is molded to have a desired shape according to a conventional ceramic molding method such press molding using a mold, rubber press molding, extrusion molding, slurry casting molding, injection molding, compression molding or hot press molding.

The molded body is then sintered. In order to prevent oxidation of silicon nitride, it is necessary to carry out the sintering in a non-oxidizing atmosphere under a pressure of at least one atmosphere. It is especially preferred that the sintering be carried out in an atmosphere of $N_2$.

The sintering temperature differs depending on the kinds and mixing ratios of starting material powders and the sintering method. However, in order to increase the denseness of the sintered body, it is indispensable that the sintering should be carried out at a temperature of at least 1600° C.

Any of known sintering methods may be adopted, and an over pressure sintering (GPS) method, a hot press (HP) method, a hot isostatic press (HIP) method or a pressureless sintering (PL) method is preferably adopted.

The silicon nitride sintered body has a relative density corresponding to at least 95%, preferably at least 98%, of the theoretical density. Furthermore, the silicon nitride sintered body of the present invention has an oxidation-increased amount (1300° C., 100 hours) of less than 0.90 mg/cm$^2$, especially less than 0.5 mg/cm$^2$, as determined according to the method described hereinafter. Moreover, the silicon nitride sintered body of the present invention has a flexural strength of at least 64 kg/mm$^2$ at 1300° C. and at least 55 kg/mm$^2$ at 1400° C.

In the sintered body of the present invention, the amounts of the atoms of the components (ii) or (ii') present in the grain boundary of silicon nitride can be determined by a transmission electron microscope.

The present invention will now be described in detail with reference to the following examples that by no means limit the scope of the invention.

EXAMPLE 1

Various additives were added to silicon nitride at various ratios and properties of sintered bodies prepared from the resulting compositions were measured.

Incidentally, α-Si$_3$N$_4$ having an average particle size of 0.6 μm was used as the silicon nitride, and additive components shown in Table 1 were added to the silicon nitride at ratios shown in Table 1. The resulting composition was dispersed and mixed by using ethanol as a medium by means of urethane balls for 24 hours. Paraffin wax was added as a binder to the mixed powder and the mixture was granulated and molded in a mold under a pressure of 1 ton/cm$^2$. The molded body was sintered under sintering conditions shown in Table 2.

With respect to each of the so-obtained sintered bodies, the strength was measured at normal temperature, 1300° C. and 1400° C., and the oxidation-increased amount was determined. The obtained results are shown in Table 2.

Incidentally, the strength was determined according to the following method. Namely, a test piece ground to have a size of 4 mm × 3 mm × 35 mm was subjected to a 0.3-mm chamfer treatment, and the strength was measured according to the 4-point bending method of JIS R-1601.

In connection with the oxidation-increased amount, the above-mentioned JIS tensile strength test piece was maintained at 1300° C. for 100 hours, and the oxidation-increased amount was expressed in terms of the value obtained by dividing the increased amount by the surface area of the test piece.

TABLE 1

| Sample No. | Si$_3$N$_4$ (% by weight) | Sr Component | (% by weight) | W Component | (% by weight) | Re Component | (% by weight) | Sr/Re Atomic Ratio | W/Re Atomic Ratio | Other Component (1) | (parts by weight) |
|---|---|---|---|---|---|---|---|---|---|---|---|
| 1* | 78 | SrO | 7 | WO$_3$ | 7 | Y$_2$O$_3$ | 8 | 0.95 | 0.43 | — | |
| 2* | 77 | SrO | 16 | WO$_3$ | 3 | Yb$_2$O$_3$ | 4 | 7.61 | 0.64 | — | |
| 3* | 77 | SrO | 3 | WO$_3$ | 15 | La$_2$O$_3$ | 5 | 0.94 | 2.11 | — | |
| 4* | 77 | SrO | 4 | WO$_3$ | 3 | Y$_2$O$_3$ | 16 | 0.54 | 0.18 | — | |
| 5 | 90 | SrO | 0.07 | WO$_3$ | 3.78 | Y$_2$O$_3$ | 6.15 | 0.01 | 0.3 | — | |
| 6 | 90 | SrO | 0.55 | WO$_3$ | 3.6 | Y$_2$O$_3$ | 5.85 | 0.10 | 0.3 | — | |
| 7 | 90 | Sr$_3$N$_2$ | 0.75 | WSi$_2$ | 3.6 | Yb$_2$O$_3$ | 5.65 | 0.15 | 0.3 | — | |
| 8 | 90 | SrC$_2$ | 0.8 | WC | 2.1 | Yb$_2$O$_3$ | 7.1 | 0.20 | 0.3 | — | |
| 9 | 90 | SrO | 1.15 | WO$_3$ | 2.05 | LaN | 6.8 | 0.25 | 0.2 | — | |
| 10 | 90 | SrO | 1.25 | WO$_3$ | 1.85 | CeO$_2$ | 6.9 | 0.3 | 0.2 | AlN | 4.0 |
| 11 | 90 | SrO | 1.45 | WO$_3$ | 1.85 | Nb$_2$O$_3$ | 6.7 | 0.35 | 0.2 | TiC | 2.5 |
| 12 | 90 | SrO | 1.6 | WO$_3$ | 1.75 | Sm$_2$O$_3$ | 6.65 | 0.4 | 0.2 | Cr$_2$O$_3$ | 3.0 |
| 13 | 90 | SrO | 1.9 | WO$_3$ | 1.70 | Eu$_2$O$_3$ | 6.40 | 0.5 | 0.2 | Ga | 1.0 |
| 14 | 90 | SrO | 2.65 | WO$_3$ | 1.50 | Gd$_2$O$_3$ | 5.85 | 0.8 | 0.2 | ZrO$_2$ | 1.0 |
| 15 | 90 | SrO | 3.1 | WO$_3$ | 1.40 | Tb$_2$O$_3$ | 5.50 | 1.0 | 0.2 | SiO$_2$ | 2.0 |
| 16 | 90 | SrO | 5.7 | WO$_3$ | 0.85 | Dy$_2$O$_3$ | 3.45 | 3.0 | 0.2 | Al$_2$O$_3$ | 1.5 |
| 17 | 90 | SrO | 8.41 | WO$_3$ | 0.63 | Sc$_2$O$_3$ | 0.96 | 6.0 | 0.2 | TiO$_2$ | 2.0 |
| 18 | 90 | SrO | 8.09 | WO$_3$ | 0.36 | Lu$_2$O$_3$ | 1.55 | 10 | 0.2 | MoO$_3$ | 2.0 |
| 19 | 90 | SrO | 9.29 | WO$_3$ | 0.21 | Y$_2$O$_3$ | 0.5 | 20 | 0.2 | AlN | 4.2 |
| 20* | 90 | SrO | 9.29 | WO$_3$ | 0.21 | Y$_2$O$_3$ | 0.5 | 20 | 0.2 | AlN | 7.0 |
| 21 | 90 | SrO | 9.55 | WO$_3$ | 0.09 | Yb$_2$O$_3$ | 0.36 | 50 | 0.2 | — | |
| 22* | 90 | SrO | 9.55 | WO$_3$ | 0.09 | Yb$_2$O$_3$ | 0.36 | 50 | 0.2 | TiO$_2$ | 9.5 |
| 23 | 90 | SrO | 9.77 | WO$_3$ | 0.04 | Yb$_2$O$_3$ | 0.19 | 100 | 0.2 | — | |
| 24* | 90 | SrO | 9.77 | WO$_3$ | 0.04 | Yb$_2$O$_3$ | 0.19 | 100 | 0.2 | ZrO$_2$ | 10.0 |
| 25 | 90 | SrO | 1.52 | WO$_3$ | 0.17 | Y$_2$O$_3$ | 8.31 | 0.2 | 0.01 | — | |
| 26 | 90 | SrO | 1.32 | WO$_3$ | 1.48 | Y$_2$O$_3$ | 7.2 | 0.2 | 0.1 | — | |
| 27 | 90 | SrO | 1.24 | WO$_3$ | 2.06 | Y$_2$O$_3$ | 6.7 | 0.2 | 0.15 | — | |
| 28 | 90 | SrO | 2.44 | WO$_3$ | 1.62 | Y$_2$O$_3$ | 5.95 | 0.3 | 0.2 | — | |
| 29 | 90 | SrO | 1.53 | WO$_3$ | 2.87 | Y$_2$O$_3$ | 5.60 | 0.3 | 0.25 | — | |
| 30 | 90 | SrO | 1.45 | WO$_3$ | 3.25 | Y$_2$O$_3$ | 5.3 | 0.3 | 0.3 | — | |
| 31 | 90 | SrO | 1.32 | WO$_3$ | 3.92 | Y$_2$O$_3$ | 4.76 | 0.3 | 0.4 | — | |
| 32 | 85 | SrO | 1.80 | WO$_3$ | 6.70 | Y$_2$O$_3$ | 6.5 | 0.3 | 0.5 | — | |
| 33 | 85 | SrO | 1.40 | WO$_3$ | 8.47 | Y$_2$O$_3$ | 5.13 | 0.3 | 0.8 | — | |
| 34 | 85 | SrO | 1.22 | WO$_3$ | 9.28 | Y$_2$O$_3$ | 4.5 | 0.3 | 1.0 | — | |
| 35 | 85 | SrO | 0.57 | WO$_3$ | 12.41 | Y$_2$O$_3$ | 2.02 | 0.3 | 3.0 | — | |
| 36 | 80 | SrO | 0.41 | WO$_3$ | 18.12 | Y$_2$O$_3$ | 1.47 | 0.3 | 6.0 | — | |
| 37 | 80 | SrO | 0.25 | WO$_3$ | 18.83 | Y$_2$O$_3$ | 0.92 | 0.3 | 10 | — | |
| 38 | 80 | SrO | 0.13 | WO$_3$ | 19.40 | Y$_2$O$_3$ | 0.47 | 0.3 | 20 | — | |
| 39 | 80 | SrO | 0.05 | WO$_3$ | 19.75 | Y$_2$O$_3$ | 0.20 | 0.3 | 50 | — | |
| 40 | 80 | SrO | 0.03 | WO$_3$ | 19.88 | Y$_2$O$_3$ | 0.09 | 0.3 | 100 | — | |
| 41* | 80 | SrO | 18 | WO$_3$ | 1.7 | Y$_2$O$_3$ | 0.3 | 131.9 | 5.6 | — | |
| 42* | 80 | SrO | 1.9 | WO$_3$ | 18 | Y$_2$O$_3$ | 0.1 | 41.8 | 176.8 | — | |
| 43* | 80 | SrO | 0.05 | WO$_3$ | 0.95 | Y$_2$O$_3$ | 19 | 0.006 | 0.049 | — | |
| 44* | 80 | SrO | 0.95 | WO$_3$ | 0.05 | Y$_2$O$_3$ | 19 | 0.11 | 0.003 | — | |

TABLE 1-continued

| Sample No. | $Si_3N_4$ (% by weight) | Sr Component (% by weight) | | W Component (% by weight) | | Re Component (% by weight) | | Sr/Re Atomic Ratio | W/Re Atomic Ratio | Other Component (1) (parts by weight) |
|---|---|---|---|---|---|---|---|---|---|---|
| 45 | 89.91 | SrO | 1.87 | $WO_3$ | 0.1 | $Y_2O_3$ | 8.12 | 0.51 | 0.01 AlN | 0.5 |

Note
*: comparison
(1) parts by weight per 100 parts by weight of the sum of $Si_3N_4$ and the Sr, W and Re components

TABLE 2

| Sample No. | Sintering Method (1) | Sintering Temperature (°C.) | Pressure (MPa) | Strength (kg/mm$^2$) normal temperature | Strength (kg/mm$^2$) 1300° C. | Strength (kg/mm$^2$) 1400° C. | Oxidation- Increased Amount (mg/cm$^2$) | Relative Density |
|---|---|---|---|---|---|---|---|---|
| 1* | GPS | 1950 | 0.98 | 70 | 52 | 42 | 1.21 | 99 |
| 2* | GPS | 1900 | 0.98 | 68 | 44 | 37 | 1.87 | 98 |
| 3* | GPS | 1900 | 0.98 | 62 | 47 | 32 | 1.80 | 97 |
| 4* | GPS | 1920 | 0.98 | 65 | 50 | 37 | 1.99 | 100 |
| 5 | GPS | 1900 | 0.98 | 87 | 80 | 77 | 0.34 | 99 |
| 6 | GPS | 1900 | 0.98 | 85 | 78 | 75 | 0.31 | 100 |
| 7 | HIP | 1750 | 200.0 | 91 | 88 | 76 | 0.29 | 98 |
| 8 | HIP | 1700 | 200.0 | 92 | 84 | 77 | 0.21 | 98 |
| 9 | HIP | 1800 | 200.0 | 99 | 89 | 81 | 0.40 | 100 |
| 10 | HIP | 1750 | 200.0 | 101 | 91 | 77 | 0.49 | 99 |
| 11 | GPS | 1970 | 0.98 | 94 | 87 | 81 | 0.41 | 98 |
| 12 | GPS | 1900 | 0.98 | 92 | 91 | 88 | 0.09 | 99 |
| 13 | HIP | 1850 | 200.0 | 104 | 99 | 92 | 0.08 | 100 |
| 14 | HIP | 1850 | 200.0 | 113 | 109 | 105 | 0.05 | 100 |
| 15 | HIP | 1780 | 300 kg/cm$^2$ | 104 | 88 | 79 | 0.19 | 99 |
| 16 | GPS | 1950 | 0.98 | 84 | 82 | 78 | 0.21 | 100 |
| 17 | GPS | 1980 | 0.98 | 82 | 78 | 76 | 0.22 | 100 |
| 18 | GPS | 1980 | 0.98 | 88 | 81 | 74 | 0.21 | 98 |
| 19 | GPS | 1900 | 0.98 | 77 | 71 | 66 | 0.44 | 98 |
| 20* | GPS | 1900 | 0.98 | 75 | 52 | 41 | 1.14 | 97 |
| 21 | GPS | 1950 | 0.98 | 74 | 68 | 61 | 0.82 | 97 |
| 22* | GPS | 1950 | 0.98 | 72 | 49 | 39 | 1.23 | 97 |
| 23 | GPS | 1980 | 0.98 | 70 | 64 | 60 | 0.98 | 97 |
| 24* | GPS | 1980 | 0.98 | 67 | 52 | 41 | 1.00 | 96 |
| 25 | GPS | 1900 | 0.98 | 89 | 87 | 84 | 0.22 | 98 |
| 26 | GPS | 1900 | 0.98 | 94 | 93 | 89 | 0.11 | 97 |
| 27 | GPS | 1950 | 0.98 | 114 | 98 | 91 | 0.12 | 98 |
| 28 | GPS | 1980 | 0.98 | 118 | 97 | 96 | 0.11 | 99 |
| 29 | GPS | 1980 | 4.0 | 125 | 114 | 108 | 0.09 | 100 |
| 30 | HIP | 1850 | 200.0 | 104 | 102 | 99 | 0.05 | 98 |
| 31 | HIP | 1850 | 200.0 | 98 | 96 | 93 | 0.04 | 97 |
| 32 | GPS | 1900 | 0.98 | 89 | 72 | 71 | 0.34 | 98 |
| 33 | GPS | 1900 | 0.98 | 82 | 74 | 70 | 0.44 | 99 |
| 34 | GPS | 1900 | 0.98 | 78 | 69 | 65 | 0.52 | 100 |
| 35 | GPS | 1900 | 0.98 | 80 | 74 | 62 | 0.39 | 99 |
| 36 | P.L. | 1780 | 0.098 | 72 | 65 | 61 | 0.57 | 97 |
| 37 | P.L. | 1780 | 0.098 | 70 | 69 | 60 | 0.61 | 97 |
| 38 | P.L. | 1780 | 0.098 | 71 | 64 | 60 | 0.71 | 97 |
| 39 | GPS | 1850 | 0.98 | 78 | 74 | 72 | 0.41 | 99 |
| 40 | GPS | 1850 | 0.98 | 80 | 76 | 69 | 0.37 | 99 |
| 41* | GPS | 1950 | 0.98 | Sintering impossible | | | | |
| 42* | GPS | 1950 | 0.98 | Sintering impossible | | | | |
| 43* | GPS | 1950 | 0.98 | 95 | 38 | 36 | 0.99 | 99 |
| 44* | GPS | 1950 | 0.98 | 96 | 36 | 29 | 0.89 | 98 |
| 45 | GPS | 1950 | 0.98 | 103 | 95 | 91 | 0.15 | 99 |

Note
*comparison
(1) GPS = over pressure sintering method,
HIP = hot isostatic method,
PL = pressureless sintering method,
HP = hot press method The effects of the sintered body of the present invention will now be described with reference to the data shown in Table 2.

If the amount of $Si_3N_4$ is small and the amounts of the additive are to large as in samples 1 through 4, the strength, especially the strength at 1300° C. and 1400° C., is insufficient. Samples 5 through 19, 21, 23 and 25 through 40, 45 showed high strength and high oxidation strength. There is observed a general tendency in which increase of the Sr/Re or W/Re atomic ratio results in reduction of the oxidation resistance. However, if a compound of Al, Ti, Cr or the like is added as in samples 10 through 19, the oxidation resistance can be improved.

EXAMPLE 2

Various additives were added to silicon nitride at various ratios and properties of sintered bodies prepared from the resulting compositions were measured.

Incidentally, α-Si$_3$N$_4$ having an average particle size of 0.6 μm was used as the silicon nitride, and additive components shown in Table 3 were added to the silicon nitride at ratios shown in Table 3. The resulting composition was dispersed and mixed by using ethanol as a medium by means of urethane balls for 24 hours. Paraffin wax was added as a binder to the mixed powder and the mixture was granulated and molded in a mold under a pressure of 1 ton/cm$^2$. The molded body was sintered under sintering conditions shown in Table 4.

With respect to each of the so-obtained sintered bodies, the strength was measured at normal temperature, 1300° C. and 1400° C., and the oxidation-increased amount was determined. The obtained results are shown in Table 4.

Incidentally, the strength was determined according to the following method. Namely, a test piece ground to have a size of 4 mm×3 mm×35 mm was subjected to a 0.3-mm chamfer treatment, and the strength was measured according to the 4-point bending method fo JIS R-1601.

In connection with the oxidation-increased amount, the above-mentioned JIS tensile strength test piece was maintained at 1300° C. for 100 hours, and the oxidation-increased amount was expressed in terms of the value obtained by dividing the increased amount by the surface area of the test piece.

TABLE 3

| Sample No. | Si$_3$N$_4$ (% by weight) | Sr Component (% by weight) | | Re Component (% by weight) | | Sr/Re Atomic Ratio | Other Additive (1) (parts by weight) | |
|---|---|---|---|---|---|---|---|---|
| 1* | 79 | SrO | 10 | Y$_2$O$_3$ | 11 | 1.0 | — | — |
| 2 | 80 | SrO | 10 | Y$_2$O$_3$ | 10 | 1.09 | — | — |
| 3 | 90 | SrO | 2 | Y$_2$O$_3$ | 8 | 0.27 | — | — |
| 4* | 77 | SrO | 21 | Nd$_2$O$_3$ | 2 | 8.93 | — | — |
| 5* | 77 | SrO | 2 | Yb$_2$O$_3$ | 21 | 0.35 | — | — |
| 6 | 90 | SrO | 0.09 | Y$_2$O$_3$ | 9.91 | 0.01 | — | — |
| 7 | 90 | SrC$_2$ | 0.93 | La$_2$O$_3$ | 9.07 | 0.15 | MoO$_3$ | 3.0 |
| 8 | 90 | Sr$_3$N$_2$ | 2.43 | ErN | 7.57 | 0.2 | Cr$_2$O$_3$ | 3.0 |
| 9 | 90 | SrO | 1.29 | Sm$_2$O$_3$ | 8.71 | 0.25 | AlN | 1.5 |
| 10 | 90 | SrO | 1.43 | Dy$_2$O$_3$ | 8.57 | 0.30 | TiC | 1.0 |
| 11 | 90 | SrO | 2.43 | Y$_2$O$_3$ | 7.57 | 0.35 | SiO$_2$ | 4.0 |
| 12 | 90 | SrO | 3.15 | Y$_2$O$_3$ | 6.85 | 0.5 | Ga | 3.0 |
| 13 | 90 | SrO | 4.23 | Y$_2$O$_3$ | 5.77 | 0.8 | — | — |
| 14 | 90 | SrO | 4.28 | La$_2$O$_3$ Y$_2$O$_3$ | 3.38 2.34 | 1.0 | — | — |
| 15 | 90 | SrO | 5.32 | Nd$_2$O$_3$ Yb$_2$O$_3$ | 2.16 2.52 | 2.0 | — | — |
| 16 | 90 | SrO | 8.21 | Y$_2$O$_3$ | 1.79 | 5.0 | — | — |
| 17 | 90 | SrO | 8.80 | Y$_2$O$_3$ | 1.20 | 8.0 | AlN | 1.5 |
| 18 | 90 | SrO | 8.40 | Yb$_2$O$_3$ | 1.60 | 10.0 | — | — |
| 19 | 90 | SrO | 9.12 | Lu$_2$O$_3$ | 0.88 | 20.0 | — | — |
| 20* | 90 | SrO | 8.80 | Y$_2$O$_3$ | 1.20 | 8.0 | AlN | 6.5 |
| 21* | 90 | SrO | 8.40 | Yb$_2$O$_3$ | 1.60 | 10.0 | TiN | 7.0 |
| 22* | 90 | SrO | 9.12 | Lu$_2$O$_3$ | 0.88 | 20.0 | CrN | 7.5 |
| 23 | 90 | SrO | 9.65 | LuN | 0.35 | 50.0 | — | — |
| 24 | 90 | SrO | 9.82 | LuN | 0.18 | 100.0 | — | — |

Note
*outside the scope of the present invention
(1) parts by weight per 100 parts by weight of the sum of Si$_3$N$_4$ and the Sr and Re components

TABLE 4

| Sample No. | Sintering Method (1) | Sintering Temperature (°C.) | Pressure (MPa) | Strength (kg/mm$^2$) | | | Oxidation-Increased Amount (mg/cm$^2$) |
|---|---|---|---|---|---|---|---|
| | | | | normal temperature | 1300° C. | 1400° C. | |
| 1* | GPS | 1900 | 0.98 | 50 | 40 | 35 | 1.1 |
| 2 | " | 1900 | 0.98 | 65 | 60 | 56 | 0.9 |
| 3 | " | 1950 | 0.98 | 95 | 89 | 81 | 0.2 |
| 4* | " | 1900 | 0.98 | | not densified | | |
| 5* | " | 1950 | 0.98 | 62 | 54 | 49 | 1.3 |
| 6 | " | 1900 | 0.98 | 95 | 72 | 65 | 0.9 |
| 7 | HIP | 1850 | 200 | 118 | 104 | 99 | 0.09 |
| 8 | " | 1850 | 200 | 124 | 111 | 105 | 0.05 |
| 9 | GPS | 1950 | 0.98 | 105 | 104 | 102 | 0.05 |
| 10 | " | 2000 | 1.96 | 99 | 97 | 92 | 0.08 |
| 11 | " | 1950 | 0.98 | 95 | 93 | 90 | 0.11 |
| 12 | " | 1900 | 0.98 | 78 | 76 | 77 | 0.45 |
| 13 | HIP | 1780 | 300 kgf | 94 | 72 | 65 | 0.40 |
| 14 | GPS | 1950 | 0.98 | 104 | 93 | 88 | 0.41 |
| 15 | " | 1900 | 0.98 | 78 | 72 | 66 | 0.51 |
| 16 | " | 1980 | 0.98 | 77 | 71 | 68 | 0.60 |
| 17 | " | 1950 | 0.98 | 76 | 68 | 66 | 0.21 |
| 18 | " | 1980 | 0.98 | 73 | 64 | 61 | 0.66 |
| 19 | " | 1900 | 0.98 | 70 | 62 | 59 | 0.70 |
| 20* | " | 1950 | 0.98 | 71 | 51 | 42 | 0.98 |
| 21* | " | 1980 | 0.98 | 68 | 49 | 38 | 1.21 |
| 22* | " | 1900 | 0.98 | 65 | 47 | 32 | 2.01 |
| 23 | HIP | 1850 | 200 | 82 | 67 | 62 | 0.42 |

TABLE 4-continued

| Sample No. | Sintering Method (1) | Sintering Temperature (°C.) | Pressure (MPa) | Strength (kg/mm$^2$) | | | Oxidation-Increased Amount (mg/cm$^2$) |
| --- | --- | --- | --- | --- | --- | --- | --- |
| | | | | normal temperature | 1300° C. | 1400° C. | |
| 24 | " | 1850 | 200 | 81 | 69 | 65 | 0.21 |

Note
*outside the scope of the invention
(1) GPS = over pressure sintering method,
HIP = hot isostatic press method,
PL = pressureless sintering step,
HP = hot press method The effects of the sintered body of the present invention will now be described with reference to the data shown in Table 4.

If the amount of Si$_3$N$_4$ is smaller than 80% by weight as in samples 1, 4 and 5, the strength and oxidation resistance are drastically degraded. Especially, the sintered body of sample 4 was not densified because of the excessive amount of SrO. If the amount of the Sr component is small and the Sr/Re atomic ratio is lower than 0.01, the strength and oxidation resistance are somewhat reduced. When other additive component is added as in samples 7, 8, 9 and 10, not only the oxidation resistance but also the strength is improved. However, if the amount of the additive is too large as in samples 20, 21 and 22, the strength and oxidation resistance tend to be lowered. When the amount of the Sr component is increased in the additives and the Sr/Re atomic ratio exceeds 10.0, the strength is somewhat reduced. At any rate, the sintered body within the scope of the present invention shows excellent strength and oxidation resistance at normal temperature, at 1300° C. and at 1400° C.

As is apparent from the foregoing description, a sintered body having excellent oxidation resistance and strength at high temperatures can be provided according to the present invention. More specifically, the sintered body of the present invention shows a strength (4-point bending test) of at least 55 kg/mm$^2$ at normal temperature and a high temperature (1400° C.), and the oxidation-increased amount can be controlled below 0.9 mg/cm$^2$.

According to the present invention, the oxidation resistance at high temperatures can be highly improved in a silicon nitride sintered body without reduction of the strength at high temperatures, and therefore, the application range of the silicon nitride sintered body can be greatly broadened as compared with the application range of the conventional products and the sintered body of the present invention can be preferably used as a part of a gas turbine engine or the like.

I claim:

1. A silicon nitride body comprising (i) 80 to 99% by weight of silicon nitride (ii) and 1 to 20% by weight of a strontium component, a tungsten component and a rare earth element component, wherein the atomic ratio of strontium to the rare earth element is in the range of from 0.01 to 100, the atomic ratio of tungsten to the rare earth element is in the range of from 0.01 to 100, and the relative density ratio to the theoretical density is at least 95%.

2. A sintered body as set forth in claim 1, wherein the strontium component is strontium carbonate, strontium oxide, strontium nitride or strontium carbide and is present in an amount of 0.5 to 19% by weight based on the sum of the components (i) and (ii).

3. A sintered body as set forth in claim 1, wherein the tungsten component is tungsten oxide, tungsten nitride, tungsten carbide or tungsten silicide and is present in an amount of 0.1 to 19% by weight based on the sum of the components (i) and (ii).

4. A sintered body as set forth in claim 1, wherein the rare earth element component is an oxide or nitride of a rare earth element and is present in an amount of 0.5 to 19% by weight based on the sum of the components (i) and (ii).

5. A sintered body as set forth in claim 1, wherein the strontium, tungsten and rare earth element components are present in the grain boundary phase of silicon nitride in an amount of at least 50 atom%.

6. A sintered body as set forth in claim 1, wherein the strontium, tungsten and rare earth element components are present in the grain boundary phase of silicon nitride in the form of at least one composite oxide or its glass selected from the group consisting of Sr$_3$WO$_6$, Sr$_2$WO$_5$, SrWO$_4$, Re$_2$SrO$_4$, SrRe$_4$O$_7$ and Sr$_3$SiO$_5$ in which Re stands for a rare earth element.

7. A sintered body as set forth in claim 1, wherein the oxidation-increased amount is less than 0.9 mg/cm$^2$ when the sintered body is maintained at 1300° C. in air for 100 hours.

8. A sintered body as set forth in claim 1, wherein the components (i) and (ii) are present in amounts of 85 to 95% by weight and 5 to 15% by weight, respectively.

* * * * *